United States Patent
Offermann et al.

(10) Patent No.: US 7,794,125 B2
(45) Date of Patent: Sep. 14, 2010

(54) LUMINOUS ELEMENT COMPRISING AT LEAST ONE SUBSTRATE AND A LIGHT-EMITTING COATING

(75) Inventors: Volkmar Offermann, Eschweiler (DE); Dieter Linnhofer, St. Martin d'Uriage (DE); Helmut Maeuser, Herzogenrath (DE)

(73) Assignee: Saint-Gobain Glass France, Courbevoie (FR)

( * ) Notice: Subject to any disclaimer, the term of this patent is extended or adjusted under 35 U.S.C. 154(b) by 691 days.

(21) Appl. No.: 10/567,441

(22) PCT Filed: Jul. 30, 2004

(86) PCT No.: PCT/FR2004/050370

§ 371 (c)(1),
(2), (4) Date: Nov. 30, 2006

(87) PCT Pub. No.: WO2005/018283

PCT Pub. Date: Feb. 24, 2005

(65) Prior Publication Data

US 2008/0137355 A1 Jun. 12, 2008

(30) Foreign Application Priority Data

Aug. 8, 2003 (DE) .................. 103 36 283

(51) Int. Cl.
*F21S 8/00* (2006.01)

(52) U.S. Cl. .................. 362/490; 362/511; 362/84

(58) Field of Classification Search .................. 362/490, 362/613, 618, 624, 551, 511, 493, 84, 97.4, 362/249.01, 249.02, 296.09; 313/500, 510, 313/512; 359/19, 15

See application file for complete search history.

(56) References Cited

U.S. PATENT DOCUMENTS

| | | | | |
|---|---|---|---|---|
| 4,245,882 A * | 1/1981 | Chang | .................. | 359/19 |
| 5,036,248 A * | 7/1991 | McEwan et al. | ............ | 313/500 |
| 5,223,814 A * | 6/1993 | Suman | .................. | 340/525 |
| 5,854,872 A * | 12/1998 | Tai | .................. | 385/133 |
| 6,464,381 B2 * | 10/2002 | Anderson et al. | ............ | 362/488 |
| 6,641,276 B1 * | 11/2003 | Macher et al. | ................. | 362/84 |
| 6,969,179 B2 * | 11/2005 | Sloan et al. | ................. | 362/219 |
| 6,974,229 B2 * | 12/2005 | West et al. | .................. | 362/227 |
| 2004/0114349 A1 * | 6/2004 | Golle et al. | .................. | 362/84 |

FOREIGN PATENT DOCUMENTS

| | | |
|---|---|---|
| DE | 195 12 864 | 8/1996 |
| DE | 197 03 398 | 8/1998 |
| DE | 101 08 302 | 8/2002 |
| DE | 101 26 868 | 11/2002 |
| EP | 1 053 910 | 11/2000 |
| JP | 05330381 A * | 12/1993 |

* cited by examiner

*Primary Examiner*—Sharon E Payne
(74) *Attorney, Agent, or Firm*—Oblon, Spivak, McClelland, Maier & Neustadt, L.L.P.

(57) ABSTRACT

A flat luminous element with at least one substrate and one coating, applied onto the surface of the substrate and emitting light, and including plural luminous elements configured to be separately electrically connected next to one another, in different parts of the surface, so as to obtain different luminous effects. At least one separate luminous element is provided with an enhanced luminous power relative to the luminosity of the surface and with a light emission that is directed.

26 Claims, 2 Drawing Sheets

LUMINOUS ELEMENT COMPRISING AT LEAST ONE SUBSTRATE AND A LIGHT-EMITTING COATING

CROSS-REFERENCE TO RELATED APPLICATIONS

Figure 1:
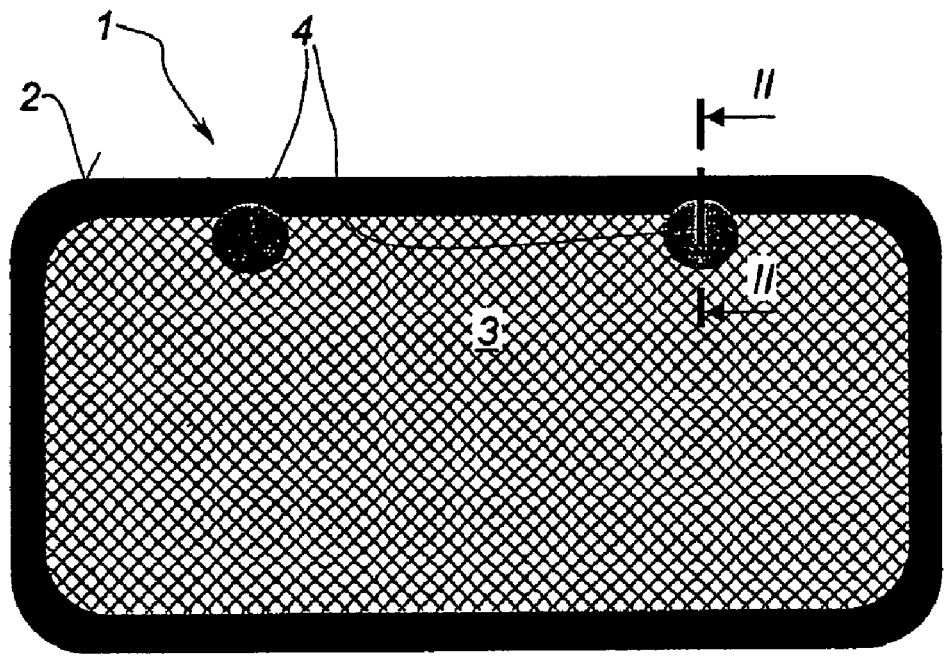

The present application is the U.S. counterpart of WO 2005/018283, and in turn claims priority to German Application No. 10336283.5 filed on Aug. 8, 2003, the entire contents of each of which are hereby incorporated herein by reference.

The invention relates to a flat luminous element comprising at least one substrate and one coating, applied onto the surface of the latter and emitting light, that comprises several luminous elements capable of being separately electrically connected next to one another, in different parts of the surface, so as to obtain different luminous effects.

Document DE-C1 101 26 868 discloses a flat luminous element with these features that is essentially formed by a layered element composed of two substrates and of a layer of adhesive bonding these together, the luminous element itself being disposed in the plane of the adhesive layer. It is formed such that only partial (opaque) surfaces emit light, whereas light can pass through other partial surfaces. Several luminous elements can be provided that are capable of being separately connected next to one another in different parts of the surface, where the electrodes and connections conducting the current can be masked in a simple manner under the opaque coating. In such a case, the electrode through which the light passes can optionally be used as a common electrode (ground) for all the luminous elements. Different luminous effects can thus be obtained, or also the luminous intensity controlled in several stages (depending on the respective luminous surface area and possibly its color).

A separate interior space lighting element in a motor vehicle can be replaced as automobile roofing substrate by a partially transparent window substrate used with the luminous element installed and for a sufficiently large surface area or high enough luminous intensity, a certain amount of light still being able to penetrate from above through the glass roof during daylight.

Document DE-A1-101 08 302 describes another flat luminous element in which the light emitting surfaces can be disposed on a frame of a transparent cover, such as for example a sunroof of an automobile. Integration of luminous elements mounted on films in a layered element is not included here.

Document EP-A2-1 053 910 also discloses an interior space lighting for vehicles based on electroluminescent flat luminous films. These can be disposed anywhere in a vehicle. A differentiated control of the various areas of the surface of a luminous element is not disclosed here.

An object of the invention is to find another field of application for a flat luminous element of this nature.

According to the invention, this problem is solved by the features of claim 1. The features of the dependent claims present advantageous embodiments of this invention.

According to the invention, the flat luminous element is now augmented by at least one separate luminous element which, by comparison with a rather diffuse emission from the rest of the luminous field, emits a directed light beam. This element can be disposed preferably in the same plane as the flat luminous element, therefore either on the surface of a single substrate used as a support medium, or inside a composite of two substrates. The composition, just as the disposition, of the flat luminous element is of secondary importance in this case; it can, for example, be a full-area lighting element, or one in the form of a frame or structured in a grid pattern.

The separate luminous element can, in principle, always be connected at the same time as the flat lighting unit. Preferably, however, it will be possible to connect or disconnect it separately, and the connection means could just as easily be disposed close to each separate luminous element (local control) as remotely from them. It can also be arranged, for example, that they be connected automatically when a vehicle stops.

In the case of a local control, sensor or touch screen switches, known per se and which are sensitive to touch or proximity, could be used. By placing, for example, a finger on the control surface, the corresponding separate luminous element could be activated and then deactivated by repeating the operation. The current feed for these switches and the corresponding switching and control elements disposed inside or outside of the flat luminous element could, if required, even be attached to that for the luminous element itself. Where necessary, such switching elements could also even be integrated into a layered element and thus need not necessarily protrude above a smooth light-emitting surface.

One especially preferred field of application of such a separate luminous element with concentrated light is a reading lamp integrated, in a particularly discrete form, into a smooth surface flat element such as, for example, a vehicle roofing substrate or a sunroof that allows an occupant to, for example, study or read a road map in the darkened interior space of a vehicle without thus substantially disturbing/dazzling other occupants of the vehicle. A separate reading lamp, such as is provided in addition to the normal vehicle interior space lighting in conventional vehicles, with the corresponding volume it occupies and its wiring, can thus be eliminated. With the configuration according to the invention, a particularly elegant and, moreover, also inexpensive solution is thus obtained. Other lighting or value-added applications may, of course, be fulfilled, for example the (automatic) targeted lighting of door-opening systems or of other functional elements in a vehicle.

Clearly, such flat luminous elements are not only suitable for uses in vehicles, but they may equally well be used in buildings or, as the case may be, for room fittings in commercial premises or residences. For example, closet lighting may be mentioned, in which such a luminous element could be installed as a ceiling or even as an intermediate shelf and here it can provide, in addition to surface lighting of the interior space, locally accentuated lighting, for example of functional element, of special structure or design.

The enhanced lighting power of the separate luminous element might, furthermore, be superimposed onto the surface lighting, in other words, in the "normal" state with the separate luminous element not connected, a lower luminous power might be emitted at this location when the flat luminous element as a whole is connected.

This differentiated emission would, for example, be possible when, as in the state of the prior art cited in the introduction, the flat luminous emission is resolved into a grid or similar. The separate luminous element could then be incorporated into this same grid, or in other words its luminous flat elements could be inserted into parts of the grid surface heretofore unused as luminous surfaces.

A higher density of light or a higher luminous power is naturally also obtained when the, or each, separate luminous element is disposed with the whole of its surface within a luminous surface that is, furthermore, patterned as a grid. In such a case, the same electroluminescent material as for the flat luminous element could be used.

However, the possibility is, on the contrary, always open of using an especially powerful electroluminescent material for the, or each, separate luminous element.

For orienting and concentrating the light emitted by the separate luminous element, according to a preferred embodiment, an optical device is provided in the region of the surface covered by the luminous element. This can be a simple lens, which is provided either directly on the luminous element or on or in a substrate covering the latter in the direction of the light emission. Such a lens could also be formed in a glass or plastic cover element or substrate (by grinding or pressing) or could also be placed in a cavity of the element as a separate part. This latter variant can be useful when the lensed face is placed on the inside within a layered element, such that the outside surface of the substrate can still be smooth.

Preferably, however, a plane lens, which itself is very thin but which nevertheless provides a good concentration and orientation of the light, can be inserted in a particularly simple manner into a layered element. Such a plane lens, whether made of glass or plastic, could of course also be placed on the outside surface of the cover element or substrate.

The required concentration and orientation of the light can also be obtained by means of a holographic element (spatial hologram) which is again disposed in said region of the surface of the separate luminous element and which is transparent to its light radiation. Such holographic elements can be fabricated in the form of films with microprisms that can provide a very precise orientation and concentration of the light for a negligible thickness. The latter can even provide particularly large deviation angles with respect to the normal emission direction perpendicular to the plane of the substrate (for this purpose, see for example DE-C1 195 12 864 or DE-C2 197 03 398).

A similar deviation and orientation behavior can be obtained with plane mirrors, which are also transparent to the light emitted by the luminous element, but which at the same time, depending on their design, become more or less transparent relative to the angle of incidence.

The possibility of adjusting the oriented beam at will could be obtained at the expense of a given local elevation above the surface of the luminous element, but this could however provide a certain special effect. For this purpose, it would be necessary to place an optical device with mirrors, lenses or the like, which can be moved by hand or by means of a miniature remote control, on the outer surface of the luminous element at the point from which the separate luminous element emits.

Other details and advantages of the object of the invention will become apparent in the drawings of an exemplary embodiment and in their detailed description that follows.

Figure 2:
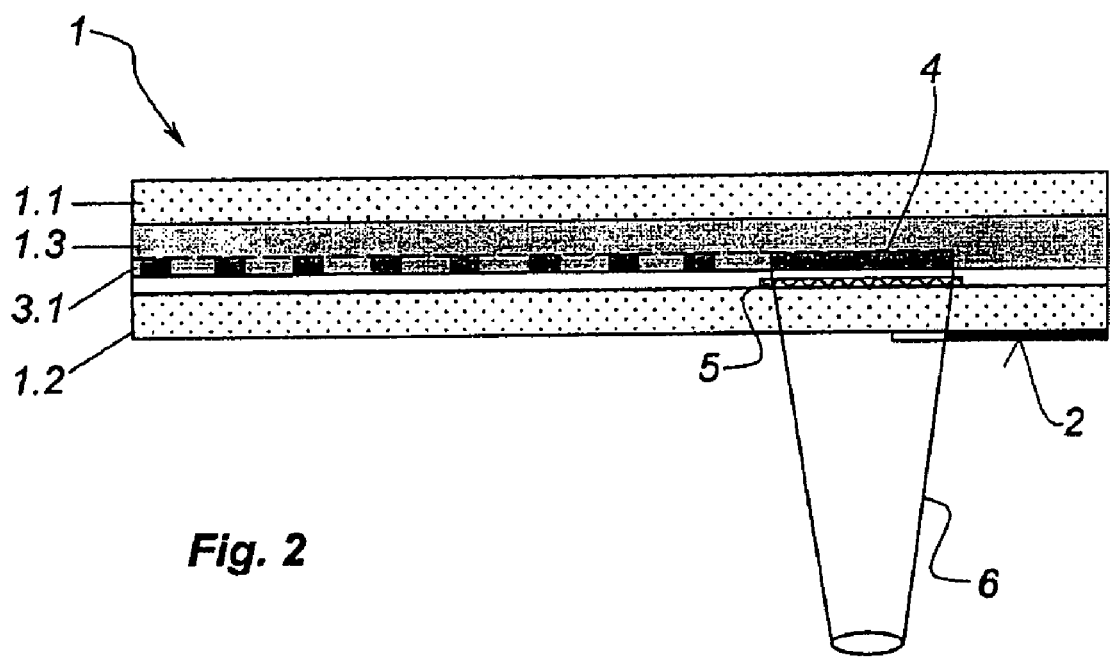
Figure 3:
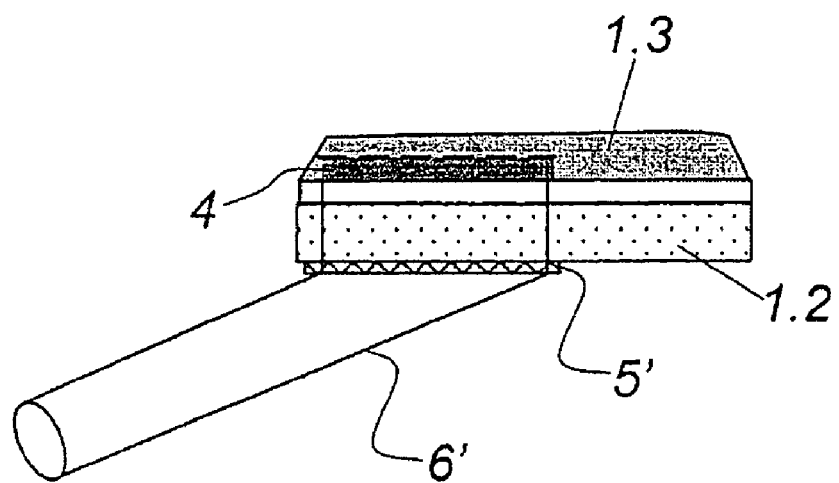
Figure 4:
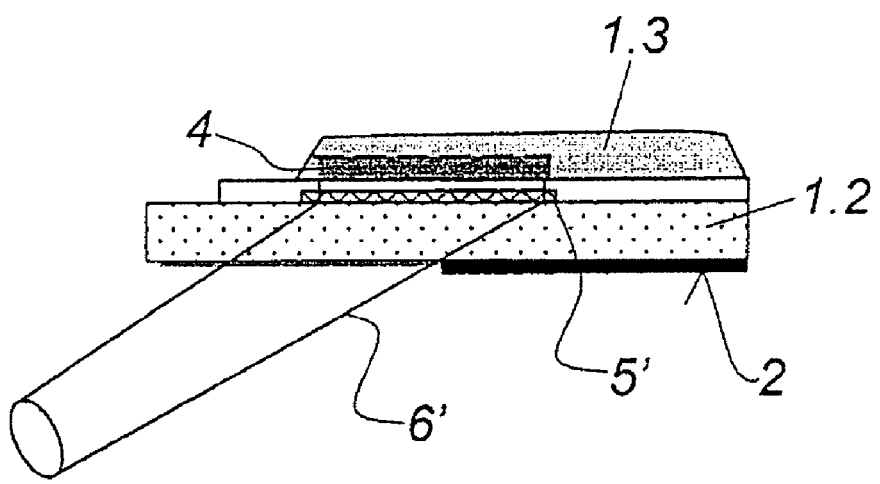

In these drawings, which are simplified representations without any particular scale, FIG. 1 is a view of one embodiment in which a roofing element or substrate, with a lighting grid pattern over the whole surface in a manner known per se, comprises two separate luminous elements, FIG. 2 shows a schematic cross-sectional view of FIG. 1 along the line II-II, FIG. 3 shows a variant in detail of a cross-sectional view as in FIG. 2, and FIG. 4 shows another variant in detail of a cross-sectional view as in FIG. 2.

FIG. 1 shows a flat luminous element 1 of rectangular shape with an opaque frame 2 and luminous field 3. The latter is configured in a known manner in a grid pattern that is composed of surface sections that let the light through and opaque surface sections. This grid patterning is not however necessary for the operation. It can be replaced by a full surface configuration, if the partial transparence to light is not necessary or desired. The lighting function itself is obtained by electroluminescence in a manner also known per se. For a more precise description of the mode of operation of such elements, reference can be simply made to the state of the art mentioned in the introduction.

Two separate luminous elements are provided on a longitudinal face of the luminous element 1. These elements can, as is shown here, partially or completely cover the opaque frame 2, or alternatively be situated entirely in the luminous field region 3 of the surface without covering or touching the frame 2. The separate luminous elements 4 are regions of enhanced luminous power or density.

The luminous elements 4 can, of course, also be disposed asymmetrically.

As can be better seen in FIG. 2, the flat luminous element 1 is fabricated in the form of a layered element with a first substrate 1.1, a second transparent substrate 1.2 and an adhesive layer 1.3 that assembles the two substrates flat against each other. A flat electroluminescent element 3.1, which could be disposed on a separate support film and which forms the luminous field 3, is disposed in between the adhesive layer 1.3 and the substrate 1.2. The precise (multilayered) structure of this luminous element is here assumed to be known. It will only be pointed out that an upper surface electrode of this luminous element is indicated here by a horizontal dashed line, and that the luminous element is assembled horizontally, in a manner not shown in more detail here, also with the transparent substrate 1.2 (for example, by another thin adhesive layer).

The separate luminous element 4 is located on the right-hand edge of the cross-sectional representation in the region of the opaque frame 2. This has a small cutout, as can also be seen in FIG. 1, in the region of its surface overlap (seen in vertical projection on the plane of the substrate 1.2) with the luminous element 4. Here, the latter is not grid patterned, as opposed to the luminous field 3, but has a full area such that it produces a higher density of light, even if the same electroluminescent coating is used as for the luminous field 3. In addition, an optical device 5 is provided in the form of a plane lens inserted within the layered element, which concentrates and orients the light emitted in a parallel direction by the separate luminous element 4, as is indicated schematically by a light cone 6. Here, the light is emitted practically perpendicular to the plane of the substrate.

The situation in FIG. 3 is different, where an optical device 5' produces a light cone 6' that is greatly deviated with respect to the normal to the plane of the substrate. This optical device 5' is a hologram on a film that is bonded here to the outer surface of the substrate 1.2. This hologram could also be inserted into the layered element, like the plane lens 5. However, the refraction of the light at the transition between the substrate 1.2 and the outside air then needs to be compensated for or taken into account, if required.

The structure shown in FIG. 4 represents an embodiment suited to this purpose, which can be seen as a combination of the embodiments in FIGS. 2 and 3. In this case, the optical device 5' is situated on the inside. It is again used for the orientation and/or the concentration of the light emitted by the luminous element 4. In order to avoid total internal reflection at the layer interface (for example the glass-air interface) of the outer surface of the substrate 1.2 (the emitted light would, in this case, be transmitted inside the substrate 1.2), this outside surface is coated with an appropriate antireflection layer 7. This can be provided either locally, hence only at the desired exit point of the light beam, or over the whole surface.

With such a combination, a large-area or even complete coverage of the actual light source (luminous element 4) could be provided with an opaque coating disposed on it and thus, if required, a protection against glare. By means of the optical element 5', the light is deviated within the transparent substrate 1.2 along the coating and only exits later at a different place on the substrate 1.2. With suitable optical devices, the light can be guided, in a manner known per se, firstly over a given distance within the glass or plastic of the substrate and then be led toward the outside at a predetermined place by means of an antireflection layer or other optical device.

The invention claimed is:

1. A flat luminous element comprising:
   at least one substrate;
   one flat coating arranged on a surface of the substrate and including
      a first electroluminescent region of the flat coating that emits a light having a first light density, and
      a second electroluminescent region of the flat coating that emits a light having a second light density; and
   a flat optical device configured to concentrate the light emitted by the second electroluminescent region into a tapered light beam.

2. The flat luminous element as claimed in claim 1, wherein the flat optical device is further configured to deviate the tapered light beam.

3. The flat luminous element as claimed in claim 1, further comprising:
   an additional substrate, at least one of the substrates being transparent to the light emitted by the first electroluminescent region and the light emitted by the second electroluminescent region, wherein the first electroluminescent region and the second electroluminescent region are disposed between the two substrates.

4. The flat luminous element as claimed in claim 3, wherein the flat optical device is disposed on or in the at least one substrate that is transparent to the light emitted by the first electroluminescent region and the light emitted by the second electroluminescent region.

5. The flat luminous element as claimed in claim 2, wherein the flat optical device includes a plane lens.

6. The flat luminous element as claimed in claim 2, wherein the flat optical device includes a holographic element including a film with microprisms, and the holographic element is transparent to the light emitted by the second electroluminescent region and configured to deviate the light emitted by the second electroluminescent region.

7. The flat luminous element as claimed in claim 2, wherein the flat optical device includes a plane mirror that is transparent to the light emitted by the second electroluminescent region and configured to deviate the light emitted by the second electroluminescent region.

8. The flat luminous element as claimed in claim 2, wherein the flat optical device is disposed directly onto the second electroluminescent region.

9. The flat luminous element as claimed in claim 3, wherein at least a part of the light emitted by the second electroluminescent region is guided inside the at least one substrate that is transparent to the light emitted by the first electroluminescent region and the light emitted by the second electroluminescent region, acting as a light waveguide, and the at least part of the light is emitted elsewhere well away from the second electroluminescent region.

10. The flat luminous element as claimed in claim 1, wherein the direction of emission of the light from the second electroluminescent region deviates from the normal to a plane of the at least one substrate.

11. The flat luminous element as claimed in claim 1, further comprising an antireflection layer provided at least at a place of exit of a light ray from the second electroluminescent region.

12. The flat luminous element as claimed in claim 1, further comprising at least one switching element for connecting and/or disconnecting the second electroluminescent region.

13. The flat luminous element as claimed in claim 12, wherein the at least one switching element includes a touch or a proximity detector associated with a surface of the flat luminous element.

14. The flat luminous element as claimed in claim 2, further comprising, in a region of a surface of the second electroluminescent region, an opaque coating, along which the light emitted by the second electroluminescent region is deviated by the flat optical device.

15. The flat luminous element as claimed in claim 1, wherein the second light density per unit area of the coating is greater than the first light density per the unit area of the coating.

16. The flat luminous element as claimed in claim 1, wherein the second light density of the light emitted by the second electroluminescent region is greater than the first light density of the light emitted by the first electroluminescent region.

17. An interior equipment of a vehicle comprising:
   a flat luminous element that includes
      at least one substrate,
      one flat coating arranged on a surface of the substrate and including
         a first electroluminescent region of the flat coating that emits a light having a first light density, and
         a second electroluminescent region of the flat coating that emits a light having a second light density, and
      a flat optical device configured to concentrate the light emitted by the second electroluminescent region into a tapered light beam.

18. The interior equipment of the vehicle as claimed in claim 17, wherein the second light density per unit area of the coating is greater than the first light density per the unit area of the coating.

19. The interior equipment of the vehicle as claimed in claim 17, wherein the second light density of the light emitted by the second electroluminescent region is greater than the first light density of the light emitted by the first electroluminescent region.

20. A roofing substrate or element of a vehicle comprising:
   a flat luminous element that includes
      at least one substrate,
      one flat coating arranged on a surface of the substrate and including
         a first electroluminescent region of the flat coating that emits a light having a first light density, and
         a second electroluminescent region of the flat coating that emits a light having a second light density, and
      a flat optical device configured to concentrate the light emitted by the second electroluminescent region into a tapered light beam.

21. The roofing substrate or element of the vehicle as claimed in claim 20, wherein the second light density per unit area of the coating is greater than the first light density per the unit area of the coating.

22. The roofing substrate or element of the vehicle as claimed in claim 20, wherein the second light density of the light emitted by the second electroluminescent region is greater than the first light density of the light emitted by the first electroluminescent region.

23. An interior surface of a building comprising:
a flat luminous element that includes
   at least one substrate,
   one flat coating arranged on a surface of the substrate and including
      a first electroluminescent region of the flat coating that emits a light having a first light density, and
      a second electroluminescent region of the flat coating that emits a light having a second light density, and
   a flat optical device configured to concentrate the light emitted by the second electroluminescent region into a tapered light beam.

24. The interior surface of the building as claimed in claim 23, wherein the second light density per unit area of the coating is greater than the first light density per the unit area of the coating.

25. The interior surface of the building as claimed in claim 23, wherein the second light density of the light emitted by the second electroluminescent region is greater than the first light density of the light emitted by the first electroluminescent region.

26. A flat luminous element comprising:
at least one substrate;
one flat coating arranged on a surface of the substrate and including
   a first electroluminescent region of the flat coating that emits a light having a first light density, and
   a second electroluminescent region of the flat coating that emits a light having
a second light density; and
a flat optical device configured to deviate or concentrate the light emitted by the second electroluminescent region.

* * * * *